United States Patent
Helmeke et al.

(10) Patent No.: US 6,844,073 B1
(45) Date of Patent: Jan. 18, 2005

(54) HOT MELT MOISTURE CURE POLYURETHANE ADHESIVE WITH WIDE RANGE OF OPEN TIME

(75) Inventors: Marietta B. Helmeke, Little Canada, MN (US); Jorge A. Lavieri, Minneapolis, MN (US)

(73) Assignee: H. B. Fuller Licensing & Financing Inc., St. Paul, MN (US)

( * ) Notice: Subject to any disclaimer, the term of this patent is extended or adjusted under 35 U.S.C. 154(b) by 292 days.

(21) Appl. No.: 09/965,769

(22) Filed: Sep. 27, 2001

(51) Int. Cl.$^7$ .............................................. C09J 175/06
(52) U.S. Cl. ............................... 428/423.1; 428/425.8; 156/331.4; 525/130; 525/131; 525/440; 528/83
(58) Field of Search ................................ 525/440, 130; 528/83; 156/331.4; 428/423.1, 425.8

(56) References Cited

U.S. PATENT DOCUMENTS

| | | |
|---|---|---|
| 4,775,719 A | 10/1988 | Marhevka et al. |
| 4,808,255 A | 2/1989 | Marhevka et al. |
| 4,820,368 A | 4/1989 | Marhevka et al. |
| 4,889,915 A * | 12/1989 | Brauer ....................... 525/458 |
| 5,441,808 A | 8/1995 | Anderson et al. |
| 5,869,593 A | 2/1999 | Helmeke et al. |
| 6,136,136 A * | 10/2000 | Heider ..................... 156/331.4 |
| 6,207,248 B1 | 3/2001 | Yang et al. |
| 6,221,978 B1 | 4/2001 | Li et al. |

FOREIGN PATENT DOCUMENTS

| | | |
|---|---|---|
| WO | WO 97/30100 | 8/1997 |

OTHER PUBLICATIONS

Joachim Julia and Daniel Selvatell;, "Thermoplastic Polyurethanes: Chemistry Opens Up New Opportunities"; Dec. 1997/Jan. 1998; pp. 24 and 26.

* cited by examiner

Primary Examiner—Patricia A. Short
(74) Attorney, Agent, or Firm—Bin Su

(57) ABSTRACT

A hot melt moisture cure polyurethane adhesive composition includes at least one polyurethane prepolymer. The prepolymer includes the reaction product of a polyol component and a polyisocyanate component. The polyol component includes a) at least one amorphous polyester polyol comprising the reaction product of neopentyl glycol, hexanediol and at least one of phthalic anhydride and phthalic acid; b) at least one liquid polyester polyol having a viscosity of greater than about 10,000 cps at 80° C.; c) at least one crystalline polyester polyol having a melting point of from about 40° C. to about 120° C.; and d) at least one thermoplastic polyurethane.

29 Claims, 4 Drawing Sheets

HOT MELT MOISTURE CURE POLYURETHANE ADHESIVE WITH WIDE RANGE OF OPEN TIME

FIELD OF INVENTION

The invention is directed to a hot melt moisture cure polyurethane adhesive composition that exhibits wide open time range with good green strength and good adhesion to low surface energy substrates.

BACKGROUND OF INVENTION

Hot melt moisture cure polyurethane adhesives are comprised of isocyanate-terminated polyurethane prepolymers that are substantially solvent-free solids at ambient temperature. These prepolymers are often applied in the form of liquid or melt and upon cooling and curing form bonds through chain-extension by the reaction of isocyanate groups with surface moisture or ambient moisture.

While conventional hot melt adhesives can be repeatedly heated to a liquid and cooled to a solid, a hot melt moisture cure adhesive undergoes an irreversible chemical reaction to a solid "cured" form once dispensed in the presence of ambient moisture. Therefore, hot melt moisture cure adhesives are useful for applications that experience high temperatures including, e.g., architectural components on building exteriors and components of recreational vehicles.

Certain applications benefit from hot melt moisture cure adhesives that have a relatively short open time. High-speed continuous adhesion processes, for example, often require that the initial bond between two sheet-like components (e.g., a foil or laminate and a profile or a solid core), be made very quickly, e.g., as quickly as the bonded components are extruded from a roller. Other applications, however, benefit from hot melt moisture cure adhesives that have a relatively longer open time. For example, assembling large parts such as composite panels useful for structures including e.g., recreational vehicle side walls or garage doors, often requires that the initial bond between two large parts be made over a longer period of time, e.g., over a sufficient amount of time for work to be done before the adhesives convert from liquid melt to solid state.

A hot melt moisture cure adhesive having a wide open time range with good green strength and good adhesion to low surface energy substrates would benefit the needs of a variety of industries.

SUMMARY OF INVENTION

In one aspect, the invention is directed to a hot melt moisture cure polyurethane adhesive composition that includes at least one polyurethane prepolymer. The polyurethane prepolymer includes the reaction product of a polyol component and a polyisocyanate component. The polyol component includes:
  a) at least one amorphous polyester polyol including the reaction product of neopentyl glycol, hexanediol and at least one of phthalic anhydride and phthalic acid;
  b) at least one liquid polyester polyol having a viscosity of greater than about 10,000 cps at 80° C.;
  c) at least one crystalline polyester polyol having a melting point of from about 40° C. to about 120° C.; and
  d) at least one thermoplastic polyurethane.

In another aspect, the invention is directed to a process for bonding substrates comprising applying on at least one surface of a first substrate a hot melt moisture cure adhesive composition of the invention, contacting the adhesive composition with a second substrate, and curing the adhesive composition. Once applied on the surface of the first substrate, the adhesive composition forms a coating that can be continuous or discontinuous.

In yet another aspect, the invention is directed to an article that includes at least two substrates bonded together through the adhesive composition of the invention.

The adhesive composition can be formulated to exhibit an open time of no greater than about 12 minutes. The open time of a hot melt moisture cure adhesive may be described as being related to the flow and hardness of the adhesive. Once applied on a surface of a substrate, the adhesive will be open for a period, during which the adhesive is capable of flowing and wetting-out the surface of the substrate. The open time of an adhesive can be estimated using Rheometrics Dynamic Spectrometer by determining the time when tan delta is equal to one. In one embodiment, the adhesive composition is formulated to exhibit an open time of from about 2 minutes to about 8 minutes. In another embodiment, the adhesive composition is formulated to exhibit an open time of from about 5 seconds to about 30 seconds.

The adhesive composition can also be formulated to exhibit, upon cure, a peel adhesion failure temperature (PAFT) of at least about 220° F. In one embodiment, the adhesive composition is formulated to exhibit a peel adhesion failure temperature (PAFT) of at least about 250° F. In another embodiment, the adhesive composition is formulated to exhibit a peel adhesion failure temperature (PAFT) of at least about 300° F.

The adhesive composition can also be formulated to exhibit good green strength, which is also referred to as "initial handling strength", i.e., the strength of the adhesive bond before the adhesive composition has cured.

DETAILED DESCRIPTION OF THE INVENTION

Figure 1:
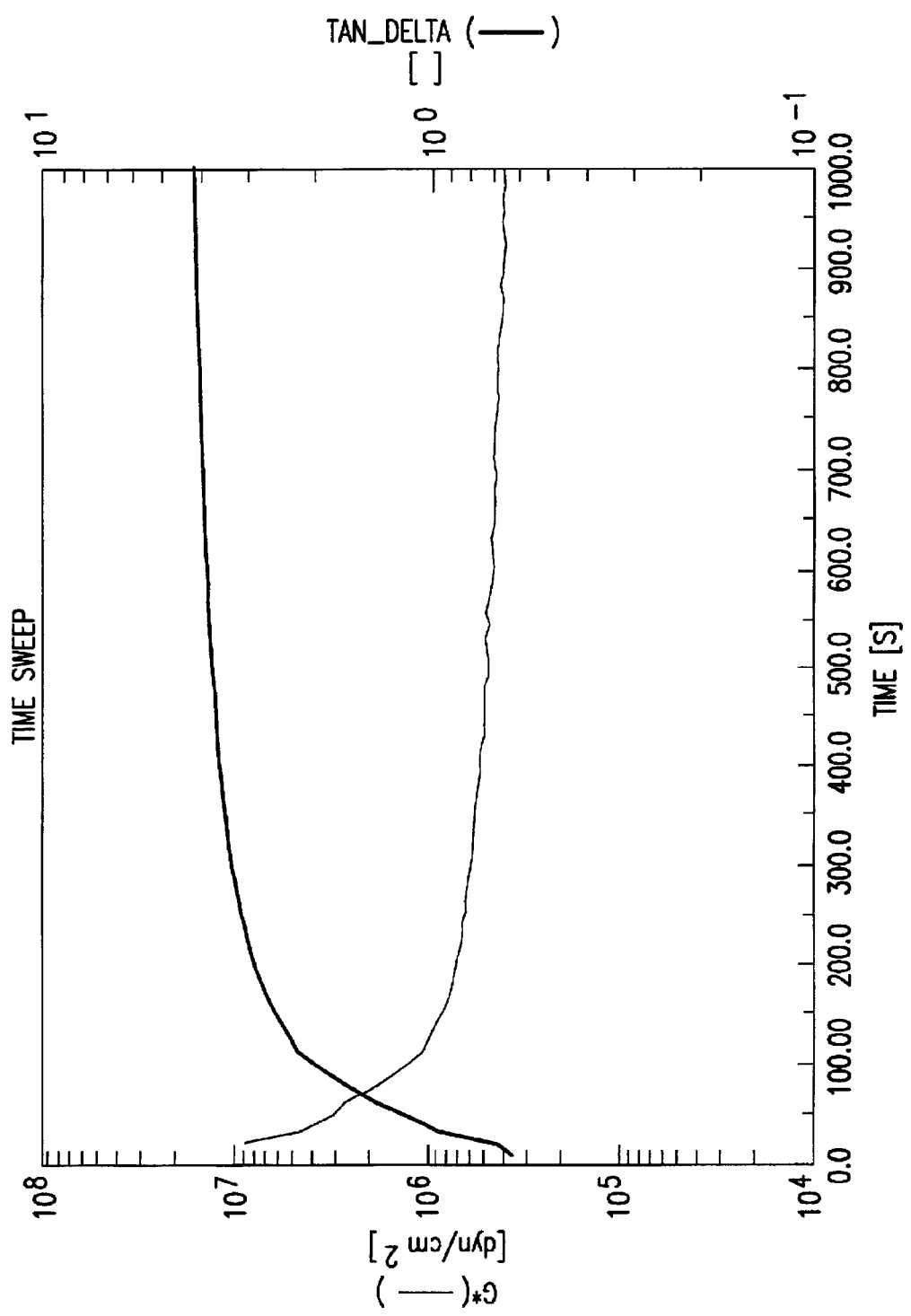
FIG. 1 represents the complex modulus (G*) and tan delta of the adhesive composition in Example 1 prior to cure.

The hot melt moisture cure polyurethane adhesive composition includes at least one polyurethane prepolymer. The polyurethane prepolymer includes the reaction product of a polyol component and a polyisocyanate component. The polyol component includes a) at least one amorphous polyester polyol, b) at least one high viscosity liquid polyester polyol, c) at least one crystalline polyester polyol, and d) at least one thermoplastic polyurethane.

The adhesive composition includes from about 5 wt % to about 30 wt %, preferably from about 10 wt % to about 20 wt %, of at least one amorphous polyester polyol, based on the total weight of the composition. Useful amorphous polyester polyols include the reaction product of neopentyl glycol, hexanediol and at least one of phthalic anhydride and phthalic acid having a hydroxy number of from about 20 to about 110, preferably from about 30 to about 75, and more preferably from about 50 to about 60. Useful amorphous polyester polyols include the reaction product of neopentyl glycol, 1,6-hexanediol and phthalic anhydride having a hydroxy number of from about 51 to about 61, which is available under the name of Agent 2227-100 from Stepan Company (Northfield, Ill.).

The adhesive composition includes from about 20 wt % to about 60 wt %, preferably from about 30 wt % to about 50 wt %, of at least one liquid polyester polyol, based on the total weight of the composition. Useful liquid polyester polyols include high viscosity, i.e., a viscosity of greater than about 10,000 cps at 80° C., liquid polyester polyols. Useful high viscosity liquid polyesterpolyols include the reaction products of at least one diol including, e.g., ethylene glycol, diethylene glycol, neopentyl glycol, hexanediol and butanediol, and at least one diacid e.g., adipic acid, phthalic acid, terephthalic acid, isophthalic acid, and mixtures thereof. Useful commercially available high viscosity liquid polyester polyols include the Dyancoll® 7200 series available from Degussa Corporation (Parsippany, N.J.).

The adhesive composition also includes from about 10 wt % to about 50 wt %, preferably from about 20 wt % to about 40 wt %, of at least one crystalline polyester polyol, based on the total weight of the composition. Useful crystalline polyester polyols include polyols having a melting point of from about 40° C. to about 130° C. and a glass transition temperature ($T_g$) of less than about 0° C. The crystalline polyester polyols preferably include the reaction product of a diol including, e.g., ethylene glycol, hexanediol, butanediol, and combinations thereof, and a diacid including, e.g., adipic acid, dodecanedioic acid, sebacic acid, terephthalic acid, and combinations thereof. Examples of commercially available polyester polyols include the Dynacoll® 7300 series of polyester polyol available from Degussa Corporation; the Rucoflex ® S-102 series and S-105 series available from Bayer Corporation (Hicksville, N.Y.).

The adhesive composition also includes from about 5 wt % to about 20 wt % of at least one thermoplastic polyurethane (TPU), based on the total weight of the composition. Thermoplastic polyurethanes are also called thermoplastic polyurethane elastomers because they are highly elastic. The thermoplastic polyurethanes include linear polymeric chains combined in block-structures. These block-structures contain low-polarity segments that are relatively long and that are called soft segments. The soft segments are covalently bonded to shorter, high-polarity "hard" segments. Useful thermoplastic polyurethanes include the reaction products of at least one soft segment (e.g., polyether, polyester and polycaprolactone) and an isocyanate, e.g., methylene diphenyl diisocyanate (MDI). More information about thermoplastic polyurethanes can be found in "Thermoplastic Polyurethanes: Chemistry Opens Up New Opportunities", Urethane Technology, pp. 24, 26, December 1997/January 1998, incorporated herein by reference. Useful thermoplastic polyurethanes are available under the Pearlbond® from Aries Technologies (Derry, N.H., a distributor of Merquinsa located in Barcelona, Spain).

The adhesive composition also includes a polyisocyanate component. The polyisocyanate component includes at least one polyfunctional isocyanate having an isocyanate functionality of at least about 2.0. Useful polyfunctional isocyanates include those isocyanates that are aliphatic and aromatic in nature. Useful polyfunctional isocyanates also include mixtures of aromatic and aliphatic isocyanates, as well as isocyanates having both aliphatic and aromatic character. Useful polyfunctional isocyanates include diphenylmethane-4-4'-diisocyanate (MDI), which is available under Isonate® 125M from Dow Chemical Co. (Midland, Mich.). Useful polyfunctional isocyanates also include those described in U.S. Pat. No. 4,775,719, U.S. Pat. No. 4,808,255, and U.S. Pat. No. 4,820,368, incorporated herein by reference.

The adhesive composition may optionally include other polyols including, e.g., other amorphous polyester polyols having a glass transition temperature ($T_g$) of from about 0° C. to about 50° C. Suitable amorphous polyester polyols include the Dynacoll® 7100 series available from Degussa Corporation.

The adhesive composition may further include a thermoplastic polymer that is not the above-described thermoplastic polyurethane. Useful thermoplastic polymers include any thermoplastic polymers that would be compatible in the adhesive composition, preferably compatible with the selected polyols. A thermoplastic polymer is compatible if it is substantially homogenous, or substantially free of phase separation, within the adhesive composition. Useful thermoplastic polymers include ethylene/vinyl acetate/copolymers, ethylene/n-butyl acrylate copolymers, ethylene/methyl acrylate copolymers, ethylene/acrylate copolymers, acrylic polymers, butylene/poly(alkylene ether) phthalate polymers, and mixtures thereof. Examples of commercially available thermoplastic polymers include butylene/poly(alkylene ether) phthalate available under the tradename Hytrel® 8171 from DuPont de Nemours (Wilmington, Del.); ethylene vinyl acetate copolymers available under the tradename Elvax® from Du Pont de Nemours, and available under the tradename Ultrathene® from Quantum Chemical Co., USI Division (Cincinnati, Ohio); ethylene n-butyl acrylate available under the tradename Enathene® from Quantum Chemical Co., available under the tradename of Escorene® from Exxon Chemical Co. (Houston, Tex.), and available under the tradename Lotryl® from Elf Atochem North America (Philadelphia, Pa.); ethylene methyl acrylate available under the tradename Optema® from Exxon; ethylene acrylate copolymers available under the tradename Elvaloy® from Du Pont; ethylene n-butyl acrylate carbon monoxide terpolymers available under the tradename Elvaloy® from Du Pont; and acrylic polymers available under the tradename Elvacite® from ICI Acrylics (St. Louis, Mo.).

The adhesive composition may further include no greater than about 2.0 wt %, preferably from about 0.01 wt % to about 2.0 wt % catalyst, based on the total weight of the adhesive composition. Useful catalysts include those that have both ether and morpholine functional groups, e.g., 4,4'-(oxydi-2,1-ethanediyl) bis-morpholine; aliphatic titanates having from 1 to 12 carbon atoms such as lower alkyl titanates e.g., tetrabutyl titanate and tetraethyl titanate; and amines, with 2,2-dimorpholinoethyl ether and di(2,6-dimethyl morpholinoethyl)ether being preferred. Examples of commercially available catalysts include 4,4'-(oxydi-2,1-ethanediyl) bis-morpholine available under the tradename Jeffcat DMDEE from Huntsman Corp. (Houston, Tex.).

The adhesive composition may further include other additives e.g., tackifying resins, plasticizers, fillers, stablilizers, anitoxidants, ultraviolet (UV) scavengers or UV absorbers, pigments, fluorescing agents, odor masks, adhesion promoters (e.g., silane), surfactants, defoamers, and combinations thereof. These additives are preferably added in an amount of less than about 5.0 wt %, more preferably less than about 2.0 wt %, based on the total weight of the adhesive composition.

Tackifying resin(s) may be incorporated into the adhesive composition to improve the tack and to impart pressure sensitive qualities of the adhesive composition, if desirable. Tackifying resins may be selected based on their compatibility with the adhesive composition. Tackifying resins having residual acid numbers such as rosin based tackifying resins and those resins having phenolic functionality are selected with care as the residual acid may react in the hot melt moisture cure system.

Plasticizers may be selected to facilitate processing and increase flexibility of the composition. Examples of useful tackifying resins and plasticizers can be found in U.S. Pat. No. 4,775,719, U.S. Pat. No. 4,808,255, U.S. Pat. No. 4,820,368, and U.S. Pat. No. 5,441,808, incorporated herein by reference.

Useful fillers include, e.g., talc, clays, silica and treated versions thereof, carbon black, mica and combinations thereof Commercially available useful fillers include talc available under the tradename Mistron® Vapor from Luzenac America, Inc. (Englewood, Col.); different particle size grades of talc available under the tradename Nytal® 200, 300 and 400 from R. T. Vanderbilt Co. (Norwalk, Conn.); Kaolin clay available under the tradename Snobrite® Clay from Evans Clay Co. (Mcintyre, Ga.); fumed silica available under the tradename Cab-o-Sil® TD-720 from Cabot Corp. (Tuscol, Ill.); and 3X and 4X micas available under the tradename Mineralite® from Mineral Mining Corp. (Kershaw, S.C.).

Stabilizers, antioxidants and combinations thereof may be added to the adhesive composition to protect it from degradation caused by reaction with oxygen induced by e.g., heat, light, or residual catalyst from the raw materials e.g., the tackifying resin. Useful antioxidants include primary antioxidants that act as free radical scavengers and may be used alone or in combination with other antioxidants. Examples of useful primary antioxidants include all hindered phenolic antioxidants available under the tradename Irganox® 565, 1010 and 1076 from Ciba-Geigy (Hawthorne, N.Y.); and hindered phenolic antioxidant available under the tradename Anox® 20 from Great Lakes Chemicals (West Lafayette, Ind.). Other antioxidants include e.g., phosphite antioxidants available under the tradename Irgafos® 168 from Ciba-Geigy. Other commercially available antioxidants include e.g., thioether antioxidant available under the tradename Cyanox® LTDP from Cytec Industries (Stamford, Conn.); hindered phenolic antioxidant available under the tradename Ethanox® 330 from Albemarle (Baton Rouge, La.). Antioxidants may be added to the adhesive composition in an amount of no greater than about 2.0 wt % in the composition.

The adhesive composition can be prepared by reacting the polyol component with the polyisocyanate component to obtain the polyurethane prepolymer.

The polyurethane prepolymer is typically prepared by reacting the polyol component with at least one polyisocyanate at an elevated temperature of from about 40° C. to about 200° C. The polyol component may first be introduced into a reaction vessel, heated to a reaction temperature and dried to remove ambient moisture absorbed by the polyol component. The polyisocyanate component is then added to the reactor. The polyol component is generally reacted with the polyisocyanate component at ratios that typically depend on the hydroxy and isocyanate functionality of the reactants. Typically the reactants are reacted at ratios which result in a reaction between isocyanate groups and hydroxy groups leaving essentially no residual hydroxy and minimal isocyanate functionality, typically less than about 10 wt %, based on the weight of the resultant prepolymer. Typically the reaction between the polyol component and the polyisocyanate component is conducted at an OH:NCO ratio of from about 0.75:1.0 to about 0.15:1.0 in order to obtain a weight percent NCO (%NCO) in the final adhesive composition of from about 1 wt % to about 5 wt %, based on the total weight of the composition. Typically the resultant prepolymer is titrated to measure residual concentration of isocyanate using ASTM D-2572-80 "Standard Method for Isocyanate Group and Urethane Materials or Prepolymers" to determine the completion of the reaction.

While the choice of components, order of addition and addition rate can be left to one of skill in the art, generally the adhesive composition can be made by reacting the isocyanate component and the polyols and then blending with the thermoplastic component and any other optional ingredients that may be added. The amount of each ingredient is based on a percentage of the resultant total weight of the adhesive composition regardless of what the ingredient is. Optionally the thermoplastic component and any other optional ingredients can be blended with the polyols before reacting with the isocyanate component.

The resultant adhesive composition can be packaged in suitable moisture proof containers. The adhesive composition is typically distributed and stored in its solid form. When it is ready for use, the adhesive composition is heated and melted prior to application.

The resultant adhesive composition preferably has a viscosity of from about 5,000 cps to about 70,000 cps at 250° F., more preferably from about 10,000 cps to about 50,000 cps at 250° F.

The invention also provides a process for bonding substrates together. The process includes applying the hot melt moisture cure adhesive composition onto at least one surface of a first substrate, contacting the adhesive composition with a second substrate, and curing the adhesive composition.

Suitable methods for applying the adhesive composition include, e.g., roll coating, spraying, extrusion, and slot die coating.

The adhesive compositions cures in the presence of moisture including, e.g., ambient moisture.

The adhesive composition is useful for bonding a variety of substrates together, especially low surface energy substrates, including e.g., polyvinylchloride (PVC), polystyrene, polyacrylate, acrylonitrile-butadiene-styrene (ABS), ethylenevinyl acetate (EVA), polycarbonate, fiber reinforced plastic (FRP), polyurethane, Nylon, primed steel, aluminum, leather, rubber, paper, wood composite panels, and combinations thereof.

The adhesive composition can be formulated to have relatively long open time and good green strength and is particularly useful for bonding large sheets or panels of substrates together to produce large articles, for which longer open time for assembling is desirable. Examples of such articles include recreational vehicle side walls, architectural doors, and furniture. The adhesive composition can also be formulated to have a relatively short open time, and thus, is particularly useful for profile wrapping in a high-speed, continuous bonding process. The adhesive composition is also suitable for use in other industries, including shoe manufacturing and bookbinding industry.

The invention is further illustrated by the following non-limiting examples. It should be understood, however, that many variations and modifications may be made while remaining within the scope of the present invention. All units are in percentage by weight unless otherwise specified.

EXAMPLES

Testing Method

Viscosity

Viscosity is measured on a Brookfield Viscometer Model DV-I using a number 27 spindle.

180° Peel Adhesion Failure Temperature (PAFT)

A sheet of #10 canvas is cut into 1"×4" strips. The adhesive is applied using a preheated 7 mil draw-down bar on a 1"×1" area of each strip while maintaining the remaining area of the strip free of adhesive. Two freshly coated strips are placed such that the coated areas bond together to produce a film having a thickness of about 14 mil. The bond is pressed with an approximately 5 lb handheld, rubber roller, and then allowed to cure for at least 10 days at 50% relative humidity and 77° F.

The cured bond is placed in a programmable oven set to increase the temperature by 25° C./hr. One end of the bond is clamped to a trigger switch. The other end of the bond is secured to a 1,000 gram weight. As the temperature increases, the adhesive softens to the point of bond failure, the weight falls and the switch is triggered, sending a signal to a recorder recording the temperature at which the bond fails. The average failure temperature of five samples is reported.

Open Time and Green Strength

The complex modulus (G*) and tan delta of an adhesive composition is measured at 1 rad/sec frequency and 25° C. using the Rheometrics Dynamic Spectrometer.

Example 1

An adhesive composition was prepared as follows:

A reactor was charged with 75 grams of Agent 2272-100, an amorphous polyester polyol that includes the reaction product of 25 mole % of 1,6-hexanediol, 25 mole % of neopentyl glycol and 50 mole % phthalic anhydride and has a hydroxy number of 56±5 (Stepan Company, Northfield, Ill.), 220 grams of Dynacoll® 7210, a high viscosity liquid polyester polyol (Degussa Corporation, Parsippany, N.J.), and 100 grams of Rucoflex® S-105-22, a crystalline polyester polyol (Bayer Corp., Hicksville, N.Y.) and then heated to 120° C. 40 grams of Pearlbond® 501, a thermoplastic polyurethane polymer (Aries Technologies, Derry, N.H.) and 2.5 grams of Irganox® 1010, a hindered phenolic anti-oxidant, were added to the mixture. The raw material blend was dried in the reactor at 120° C. for 1 hour under a vacuum of at least 27 inHg. The blend was cooled to 110° C. and the reactor was charged with 62.5 grams of Isonate® 125M, 1,1-methylene bis(4-isocyanato) benzene (Dow Chemical Co., Midland, Mich.). The reaction was carried out for 1 hour at 120° C. under vacuum. The resultant product was then poured from the reactor and purged with nitrogen. The resultant prepolymer had %NCO of 2.0 and a viscosity of 15,000 cps at 250° F. (about 121° C.).

The open time and green strength of the adhesive composition of Example 1 is illustrated in FIG. 1.

Example 2

An adhesive composition was prepared according to the procedure in Example 1 with the exception that the prepolymer was obtained from the reaction of 75 grams Agent 2272-100, 165 grams Dynacoll® 7210, 150 grams of Rucoflex® S-102-22, a crystalline polyester polyol (Bayer Corp., Hicksville, N.Y.), 45 grams of Pearlbond® 501, 2.5 grams of Irganox® 1010, 5 grams Mistron® Vapor talc filler, and 57.5 grams Isonate® 125M. The resultant prepolymer had %NCO of 2.0 and a viscosity of 25,000 cps at 250° F. (about 121° C.).

Figure 2:
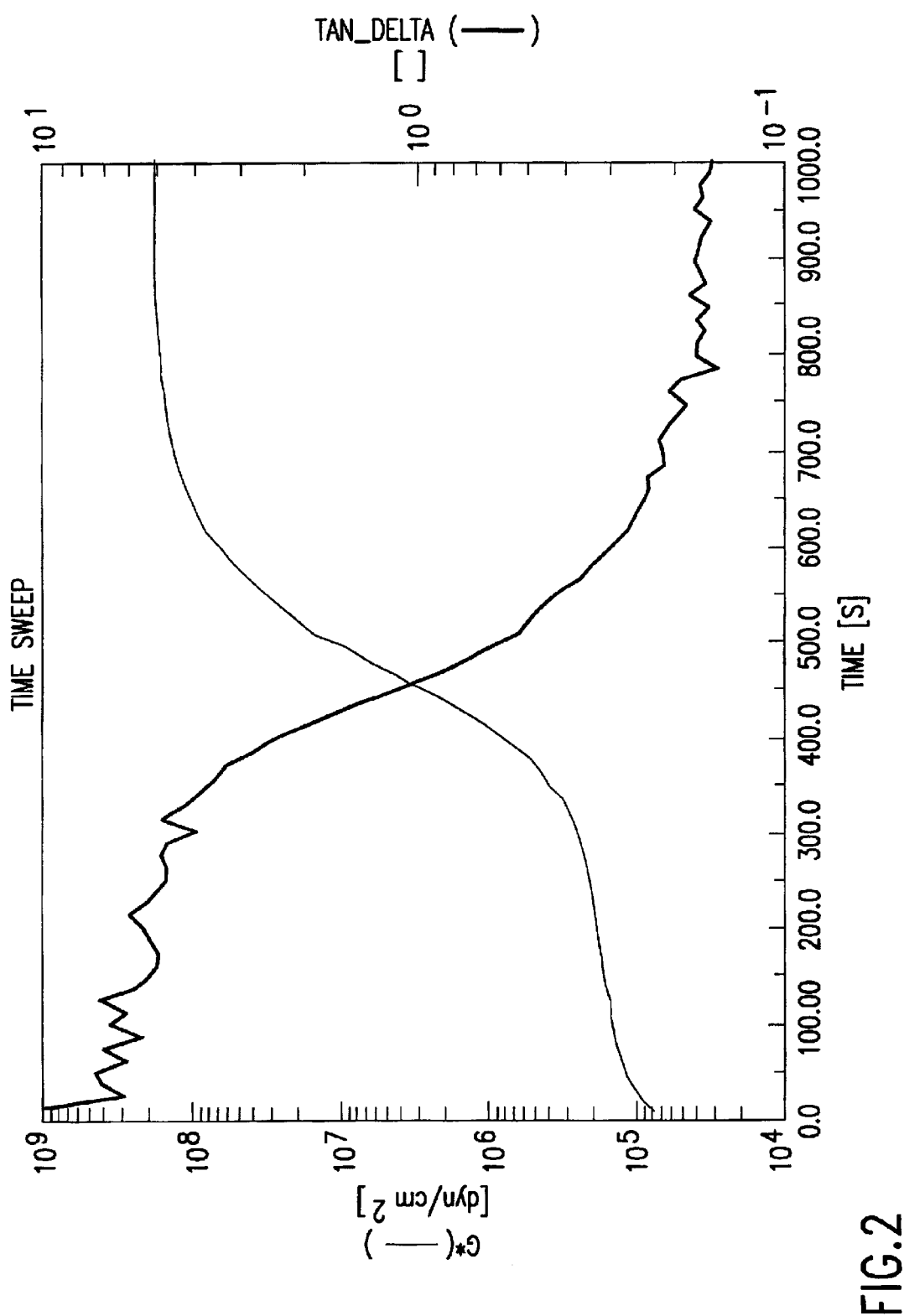
FIG. 2 represents the complex modulus (G*) and tan delta of the adhesive composition in Example 2 prior to cure.

The open time and green strength of the adhesive composition of Example 2 is illustrated in FIG. 2.

Example 3

An adhesive composition was prepared according to the procedure in Example 1 with the exception that the prepolymer was obtained from the reaction of 75 grams of Agent 2272-100, 165 grams of Dynacoll® 7210, 150 grams of Dynacoll® 7361, a crystalline polyester polyol from Degussa Corporation, 45 grams of Pearlbond® 501, 2.5 grams of Irganox® 1010, 5 grams of Mistron® Vapor, and 57.5 grams of Isonate® 125M. The resultant prepolymer had %NCO of 2.0 and a viscosity of 30,000 cps at 250° F. (about 121° C.).

Figure 3:
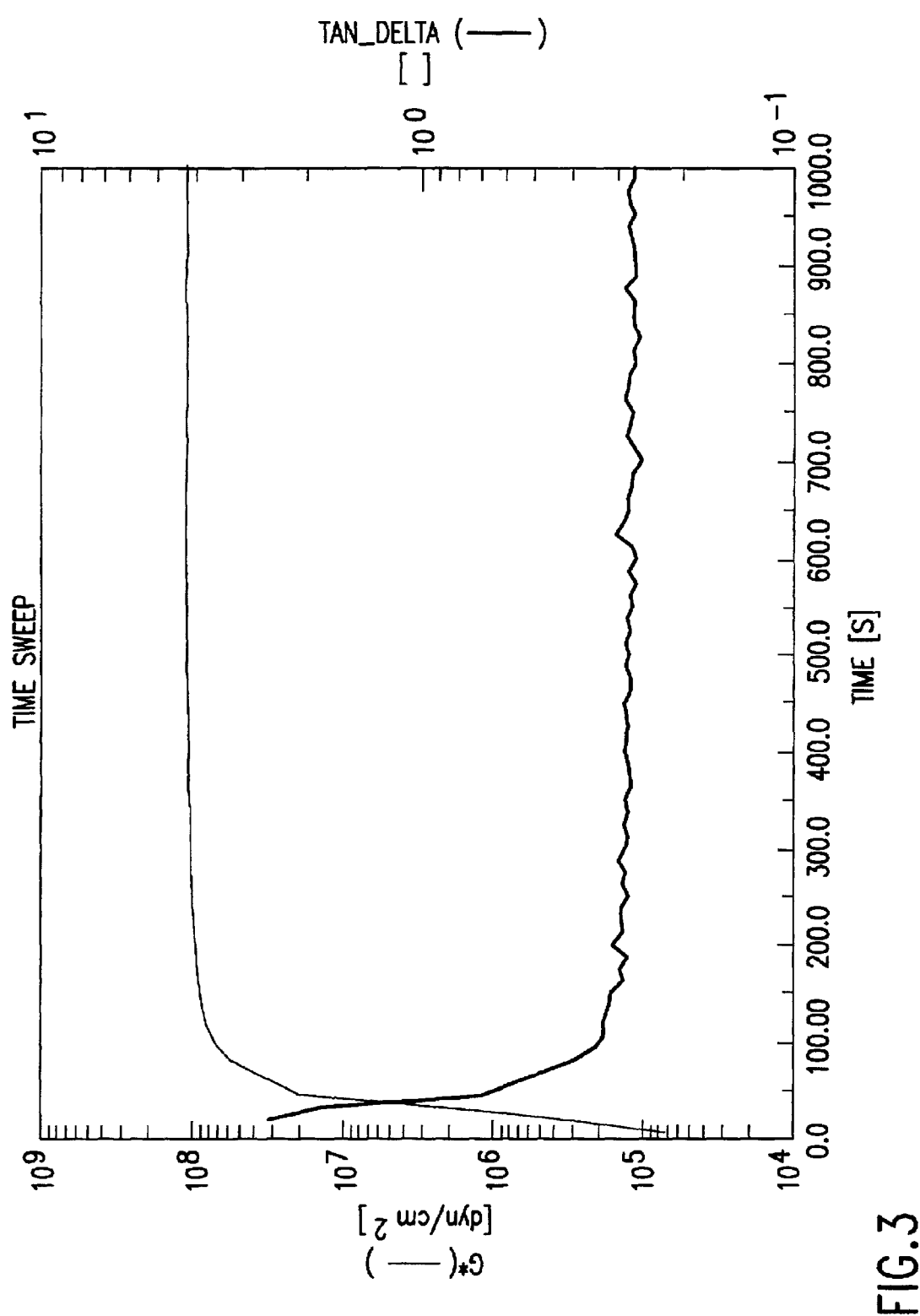
FIG. 3 represents the complex modulus (G*) and tan delta of the adhesive compositions in Example 3, prior to cure.

The open time and green strength of the adhesive composition of Example 3 is illustrated in FIG. 3.

Example 4

A reaction was carried out according to the procedure in Example 1 with 75 grams of Agent 2227-100, 190 grams of Dynacoll®V 7210, 75 grams of Rucoflex® S-105-10, 50 grams of Rucoflex® S-105-22, 45 grams of Pearlbond® 501, 2.5 grams of Irganox® 1010, 5 grams Mistron® Vapor, and 57.5 grams of Isonate® 125M. The reaction yielded a prepolymer having %NCO of 2.0 and a viscosity of 35,000 cps at 250° F. (about 121° C.).

Figure 4:
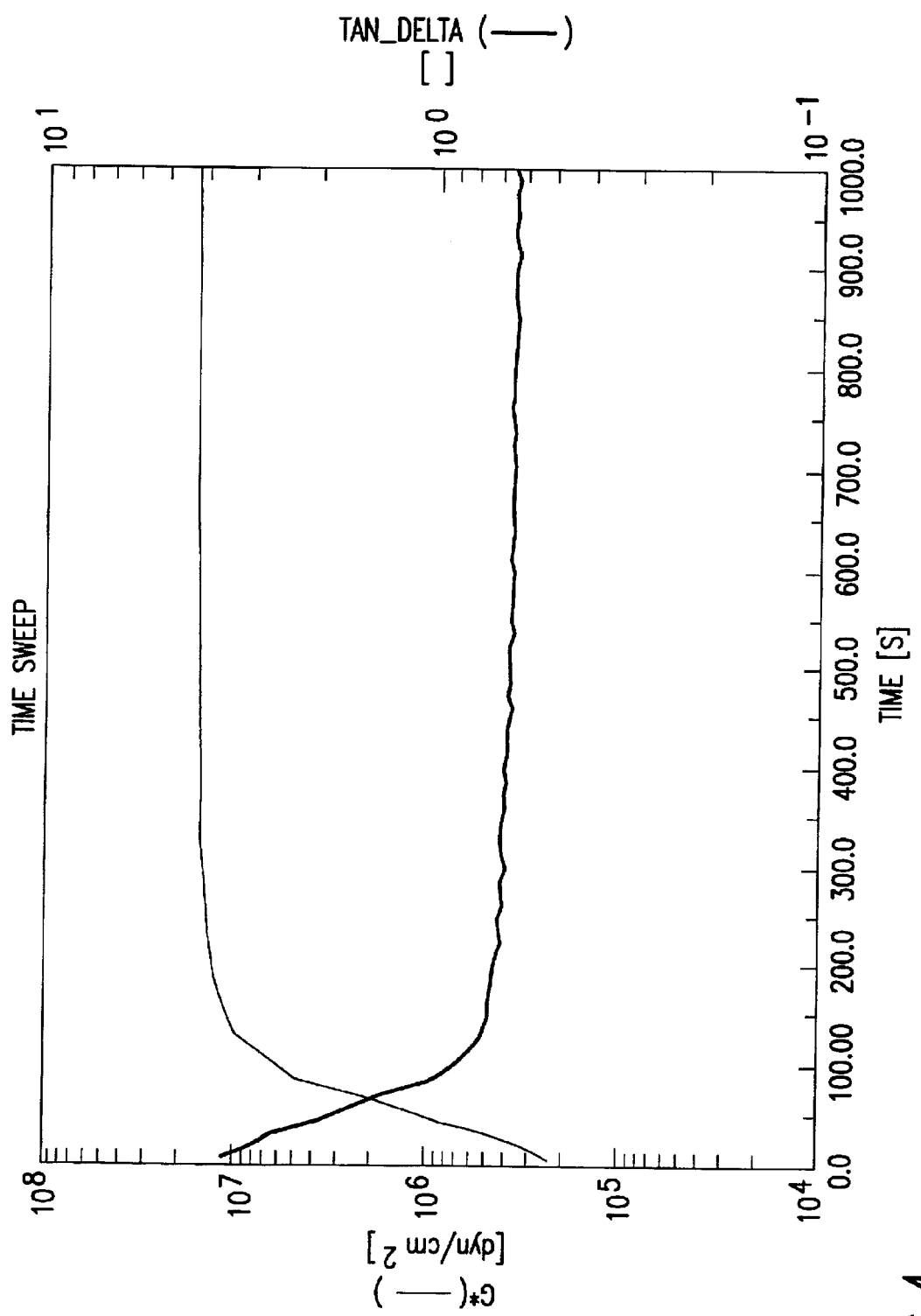
FIG. 4 represents the complex modulus (G*) and tan delta of the adhesive composition in Example 4 prior to cure.

The open time and green strength of the adhesive composition of example 4 is illustrated in FIG. 4.

We claim:

1. A hot melt moisture cure polyurethane adhesive composition comprising at least one polyurethane prepolymer, said polyurethane prepolymer comprising the reaction product of a polyol component and a polyisocyanate component, said polyol component comprising:
   a) at least one amorphous polyester polyol comprising the reaction product of neopentyl glycol, hexanediol and at least one of phthalic anhydride and phthalic acid;
   b) at least one liquid polyester polyol having a viscosity of greater than about 10,000 cps at 80° C.;
   c) at least one crystalline polyester polyol having a melting point of from about 40° C. to about 120° C.; and
   d) at least one thermoplastic polyurethane.

2. The adhesive composition of claim 1, wherein said polyol component comprises from about 5 wt % to about 30 wt % said amorphous polyester polyol.

3. The adhesive composition of claim 2 wherein said polyol component comprises from about 10 wt % to about 20 wt % said amorphous polyester polyol.

4. The adhesive composition of claim 1, wherein said liquid polyester polyol comprising the reaction product of
   at least one diol selected from the group consisting of ethylene glycol, diethylene glycol, neopentyl glycol, hexanediol and butanediol, and
   at least one diacid selected from the group consisting of adipic acid, phthalic acid, terephthalic acid, isophthalic acid and mixtures thereof.

5. The adhesive composition of claim 1, wherein said polyol component comprises from about 20 wt % to about 60 wt % said liquid polyester polyol.

6. The adhesive composition of claim 5, wherein said polyol component comprises from about 30 wt % to about 50 wt % of said liquid polyester polyol.

7. The adhesive composition of claim 1, wherein said crystalline polyester polyol comprises the reaction product of at least one diol selected from the group consisting of ethylene glycol, hexanediol and butanediol, and at least one diacid selected from the group consisting of adipic acid, sebacic acid, dodecanedioic acid and terephthalic acid.

8. The adhesive composition of claim 1, wherein said polyol component comprises from about 10 wt % to about 50 wt % said crystalline polyester polyol.

9. The adhesive composition of claim 8, wherein said polyol component comprises from about 20 wt % to about 40 wt % said crystalline polyester polyol.

10. The adhesive composition of claim 1, wherein said polyol component comprises from about 5 wt % to about 20 wt % said thermoplastic polyurethane.

11. The adhesive composition of claim 1, wherein said amorphous polyester polyol comprises the reaction product of neopentyl glycol, hexanediol and phthalic anhydride having a hydroxy number of from about 30 to about 75.

12. The adhesive composition of claim 11, wherein said amorphous polyester polyol has a hydroxy number of from about 50 to about 60.

13. The adhesive composition of claim 1, wherein said thermoplastic polyurethane comprises the reaction product of
  at least one soft segment selected from the group consisting of polyether, polyester and polycaprolactone, and
  methylene diphenyl diisocyanate.

14. The adhesive composition of claim 1, wherein said adhesive composition further comprises at least one thermoplastic polymer selected from the group consisting of ethylene/vinyl acetate/copolymers, ethylene/n-butyl acrylate copolymers, ethylene/methyl acrylate copolymers, ethylene/acrylate copolymers, acrylic polymers, butylene/poly(alkylene ether) phthalate polymers, and mixtures thereof.

15. The adhesive composition of claim 1, wherein said polyisocyanate component comprises at least one polyfunctional isocyanate having an isocyanate functionality of at least about 2.0.

16. The adhesive composition of claim 15, wherein said polyisocyanate component is diphenylmethane-4,4'-diisocyanate.

17. The adhesive composition of claim 1, wherein said adhesive composition has a viscosity of from about 5,000 cps to about 70,000 cps at 250° F.

18. The adhesive composition of claim 17, wherein said adhesive composition has a viscosity of from about 10,000 cps to about 50,000 cps at 250° F.

19. The adhesive composition of claim 1, wherein said adhesive composition has a percent weight NCO (% NCO) of no greater than about 5.

20. The adhesive composition of claim 1, wherein said adhesive composition exhibits an open time of no greater than about 12 minutes.

21. The adhesive composition of claim 20, wherein said adhesive composition exhibits an open time of from about 2 minutes to about 8 minutes.

22. The adhesive composition of claim 20, wherein said composition exhibits an open time of from about 5 seconds to about 30 seconds.

23. The adhesive composition of claim 1, wherein said adhesive composition, upon cure, exhibits a peel adhesion failure temperature (PAFT) of at least about 220° F.

24. The adhesive composition of claim 1, wherein said adhesive composition, upon cure, exhibits a peel adhesion failure temperature (PAFT) of at least about 250° F.

25. The adhesive composition of claim 1, wherein said adhesive composition, upon cure, exhibits a peel adhesion failure temperature (PAFT) of at least about 300° F.

26. A process for bonding substrates together comprising
  a) applying the hot melt moisture cure adhesive composition of claim 1 on at least one surface of a first substrate,
  b) contacting said applied adhesive composition with a second substrate, and
  c) curing said adhesive composition.

27. The process of claim 26, wherein at least one of said first and second substrates is selected from the group consisting of polyvinylchloride (PVC), polystyrene, polyacrylate, acrylonitrile-butadiene-styrene (ABS), ethylene-vinyl acetate (EVA), polycarbonate, fiber reinforced plastic (FRP), polyurethane, Nylon, primed steel, leather, rubber, paper and wood composite panels.

28. An article comprising a profile, a foil and the adhesive composition of claim 1 sandwiched between said profile and said foil.

29. An article comprising a first substrate, a second substrate and the adhesive composition of claim 1 sandwiched between said first and second substrates, wherein said article is selected from the group consisting of construction of recreational vehicle side walls, architectural doors, furnitures, books and shoes.

* * * * *